United States Patent [19]

Granzow et al.

[11] Patent Number: 4,578,567

[45] Date of Patent: Mar. 25, 1986

[54] METHOD AND APPARATUS FOR GAINING ACCESS TO A SYSTEM HAVING CONTROLLED ACCESS THERETO

[75] Inventors: Robert H. Granzow, Miamisburg, Ohio; Desh B. Gupta, Elm Grove, Wis.; Kimbrough I. Myers, Kettering, Ohio

[73] Assignee: NCR Corporation, Dayton, Ohio

[21] Appl. No.: 526,574

[22] Filed: Aug. 25, 1983

[51] Int. Cl.[4] .............................................. G06K 5/00

[52] U.S. Cl. .................................... 235/380; 235/379; 235/382

[58] Field of Search ........................ 235/379, 380, 382

[56] References Cited

U.S. PATENT DOCUMENTS

| | | | |
|---|---|---|---|
| 3,798,605 | 3/1974 | Feistel | 340/172.5 |
| 4,114,140 | 9/1978 | Kubins | 340/149 A |
| 4,163,215 | 7/1979 | Iida | 340/149 A |
| 4,376,279 | 3/1983 | Perlman | 235/380 |

*Primary Examiner*—Harold I. Pitts
*Attorney, Agent, or Firm*—Albert L. Sessler, Jr.; Elmer Wargo

[57] ABSTRACT

A method and system for gaining access to a plurality of machines at a financial, self-service center, for example. A user of the system enters first and second identifiers into the system, and upon a satisfactory evaluation, the user gains partial access to the system, and thereafter, the user enters his second and a newly-acquired third identifier to gain complete access to the plurality of machines.

16 Claims, 7 Drawing Figures

FIG. 4

112 114

| FIFO MEMORY PORTION 112 | | | |
|---|---|---|---|
| ACCOUNT NUMBER | P. I. N. | THIRD IDENTIFIER | DATA |
| 821 | | 99 | |
| 789 | | 98 | |
| 456 | | 97 | |
| … | | … | |
| 123 | | 02 | |
| 621 | | 01 | |
| 842 | | 00 | |

FIG. 6

132

| MEMORY PORTION 132 | | | | |
|---|---|---|---|---|
| ACCOUNT NUMBER | P. I. N. | THIRD IDENTIFIER | DATA | TIME CODE |
| 624 | | 01 | | 14:00 |
| 871 | | 02 | | 14:04 |

METHOD AND APPARATUS FOR GAINING ACCESS TO A SYSTEM HAVING CONTROLLED ACCESS THERETO

BACKGROUND OF THE INVENTION

This invention relates to a method and apparatus for gaining access to a system having controlled access thereto, and the specific embodiment selected to portray the invention relates to a financial, self-service center or system in which the use of identification cards and personal identification numbers is required by users of the system to gain access to financial machines like cash dispensing machines, for example, associated with the system.

One of the problems associated with some of the prior art systems of the type mentioned, is that each of the financial machines to which a user wishes access requires a card reader such as a magnetic card reader to read the user's personal magnetic identification card when that card is inserted into the machine. With each of the financial machines requiring a magnetic card reader, for example, duplication of costly card readers results. This is especially so when recent system trends are considered, trends in which clusters of banking machines having different functions are available at a location to users of the system.

Another problem with such prior art systems is that the use of magnetic identification cards is generally time-consuming when considering the necessary instructions offered to users informing them how, when, and where to enter or process the card.

SUMMARY OF THE INVENTION

In a preferred embodiment of the invention, the invention relates to a system having controlled access thereto, comprising: means for entering first and second identifiers associated with a user of said system; control means for receiving said first and second identifiers and for issuing a third identifier to said user via said entering means upon a satisfactory evaluation of said first and second identifiers; and said system having a plurality of entities and means for coupling said entities with said control means; each said entity having means for entering said second and third identifiers associated with said user; said control means having means for evaluating said second and third identifiers and for issuing a control signal to the associated said entity to enable that said user to gain access to the associated said entity upon a satisfactory evaluation of said second and third identifiers.

The method of operating a system according to this invention comprises the steps of: (a) requiring a user of the system to enter first and second identifiers associated with said user to gain partial access to said system; (b) issuing a third identifier to said user based upon a satisfactory evaluation of the user's first and second identifiers; and (c) requiring that said user enter said second and third identifiers to gain complete access to said system.

An advantage of this invention is that it is relatively inexpensive and simple to adopt.

Another advantage of the method and apparatus of this invention is that they are especially suitable for systems in which access thereto is gained in steps or stages in which total access to the system is gained only after a first step in which partial access is obtained.

These advantages and others will be more readily understood in connection with the following description, claims, and drawing.

BRIEF DESCRIPTION OF THE DRAWING

FIG. 4 is a schematic diagram showing the organization of data in in the RAM associated with the branch controller shown in FIG. 1;

FIG. 6 is a schematic diagram showing another embodiment of the way in which data is organized in the RAM associated with the branch controller shown in FIG. 1.

DETAILED DESCRIPTION OF THE INVENTION

Figure 1:
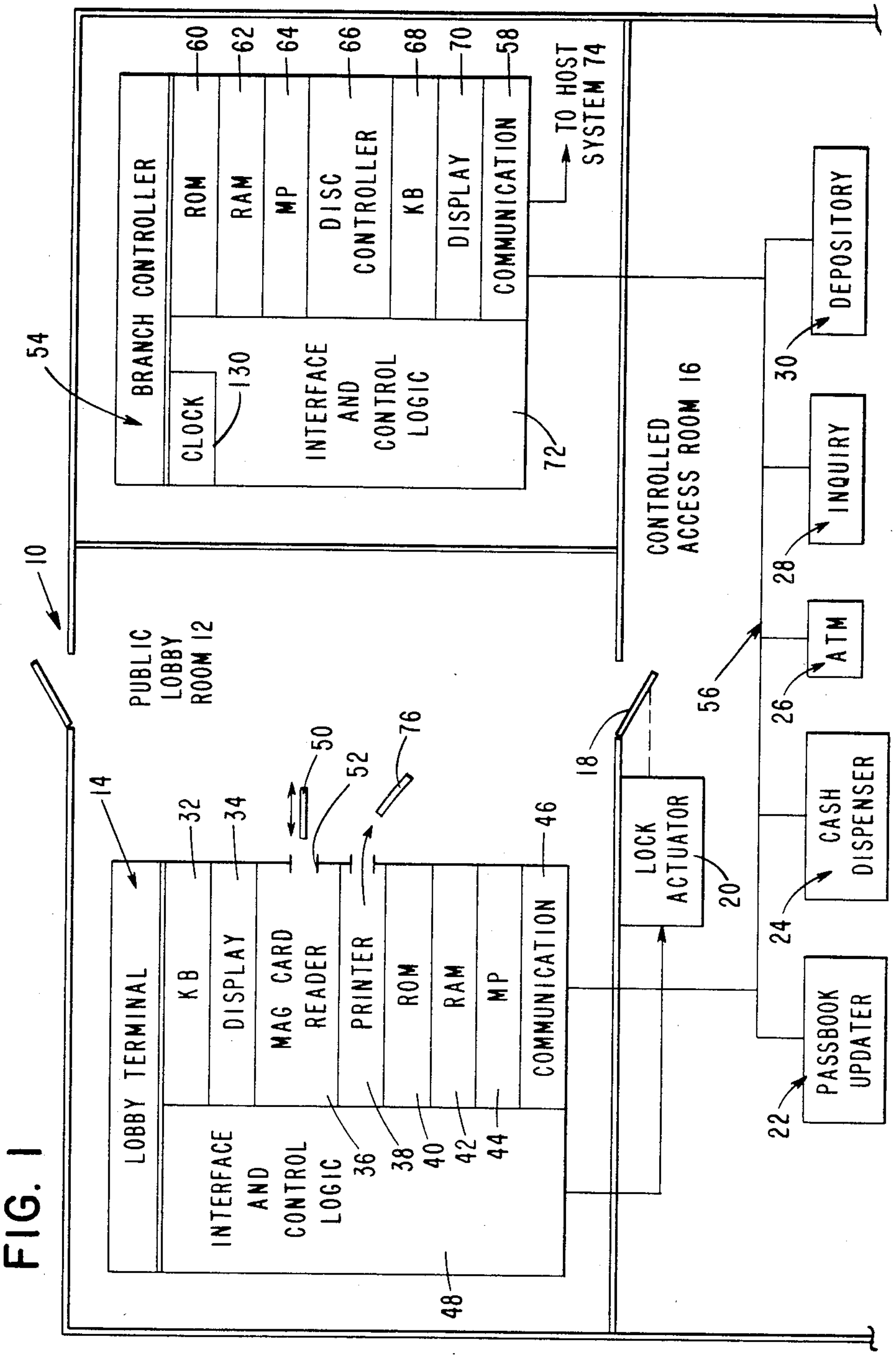
FIG. 1 is a schematic and diagrammatic view of a preferred embodiment showing a system in which the method and apparatus of this invention may be used.

FIG. 1 is a diagram showing a system 10 in which a preferred embodiment of this invention is incorporated. In the system 10, a customer or user is required to supply first and second identifiers to gain partial access to the system 10. If the first and second identifiers are valid, the user is supplied with a third identifier. The second identifier and the newly-acquired third identifier are then required to be used by the user to gain complete access to the system 10.

The system 10 is especially adaptable for use in the self-service, financial center mentioned earlier herein. One of the problems with current, automated, teller machines or ATMs is that these machines are exposed to the general public, and because they contain cash, they are potentially targets for theft and vandalism. The system 10 shown in FIG. 1 tends to minimize this problem.

The system 10 (FIG. 1) may include an outer room such as a public lobby room 12 where a means for entering the first and second identifiers mentioned is located, and this means will be referred to as lobby terminal 14. The terminal 14 is conventional such as an NCR-1770 automated teller machine; however, the terminal is modified slightly to eliminate the associated cash dispensing function. The NCR-1770 machine is available from the NCR Corporation of Dayton, Ohio. The system 10 also includes a controlled access room 16 which connects to the lobby room 12 via a normally-closed door 18. When a user of the system 10 enters his first and second identifiers (to be described) into the terminal 14 and is considered a valid user, the terminal 14 energizes the lock actuator 20 to open the door 18 permitting the user to gain access to room 16. Room 16 contains a plurality of financial, self-service machines which may contain, for example, a passbook updater 22, cash dispenser 24, ATM 26, an inquiry terminal 28 and a depository 30. It should be noted that rooms 12 and 16 are not necessary for the operation of system 10; however, when this system is applied to a financial, self-service center of the type shown in FIG. 1, there are advantages to utilizing rooms 12 and 16 as will be described hereinafter.

The lobby terminal 14 (FIG. 1) includes a keyboard (KB) 32 for manually entering data, a display 34 to enable the terminal 14 to communicate with a user, a card reader such as a magnetic card reader 36, and a printer 38. The terminal also includes a read only memory (ROM) 40, a random access memory RAM 42, a processor (MP) 44, a communication interface 46, and interface and control logic 48 which interconnects the various elements discussed.

The operation of the lobby terminal 14 (FIG. 1) is as follows. A user wishing to use the system 10 inserts his magnetic card 50 into a receiving slot 52 associated with the card reader 36. The card 50 is read by the card reader 36 (to provide the first identifier mentioned), and the terminal 14 then requests on the display 34 that the user enter his personal identification number (PIN) on the keyboard 32 to provide the second identifier mentioned. The terminal 14 then sends both the magnetic card number and the PIN to the branch controller 54 via the communication interface 46, the communication line 56, and through communication interface 58 associated with the branch controller 54.

The branch controller 54 (FIG. 1) is a controller such as the NCR-5094 controller. The NCR-5094 controller is conventional and is available from the NCR Corporation of Dayton, Ohio. The controller includes a ROM 60, a RAM 62, a processor MP 64, a disc controller 66, a KB 68, a display 70, and the communication interface 58 which are all conventionally interconnected by the interface and control logic 72. The branch controller 54 may also be coupled to a host system 74 via the communication interface 58 where necessary or convenient.

The branch controller 54 (FIG. 1), upon receiving the magnetic card number and the PIN from a user at the lobby terminal 14, checks both these numbers to make sure that they are valid numbers and to make sure that the right PIN has been entered for the associated magnetic card number or account. If the PIN is not correct, the branch controller 54 notifies the lobby terminal 14, and the user is requested via the display 34 to enter his PIN again. If after a predetermined number of tries, a user is not able to enter his correct PIN, his card 50 may be returned to him or "captured" by the lobby terminal 14 as is conventionally done. The data for account verification generally resides with the host system 74, and this data is accessed conventionally by the branch controller 54.

Assuming that the magnetic card number and the associated PIN are correct numbers, the branch controller 54 will issue a third identifier to the lobby terminal 14 for that user. In the embodiment described, the third identifier consists of a two digit number (from 0 to 99) which is consecutively (for example) assigned (for valid users) by the branch controller 54. When the third identifier is received by the lobby terminal 14, it will print the assigned third identifier via the printer 38 and issue a receipt 76 to the authorized user. At the same time, the lobby terminal 14 will request the user (via the display 34) to remove his card 50 and his receipt 76 from the terminal 14 and to proceed towards the controlled access room 16 where the various machines mentioned, such as the ATM 26 and depository 30, for example, are located. Also, the terminal 14 will energize the lock actuator 20 to unlock and open door 18, permitting the user to enter the controlled access room 16.

When a valid user enters the controlled access room 16 (FIG. 1), he is able to use any of the machines located therein by entering, simply, his PIN and third identifier in a simple operation without the necessity of having to use his magnetic card 50 in any of the machines located in room 16. This reduces the costs of the various machines shown in room 16 because a magnetic card reader is not needed for each, and it also reduces the processing time for each user because the step of reading the magnetic card 50 is eliminated.

Figure 2:
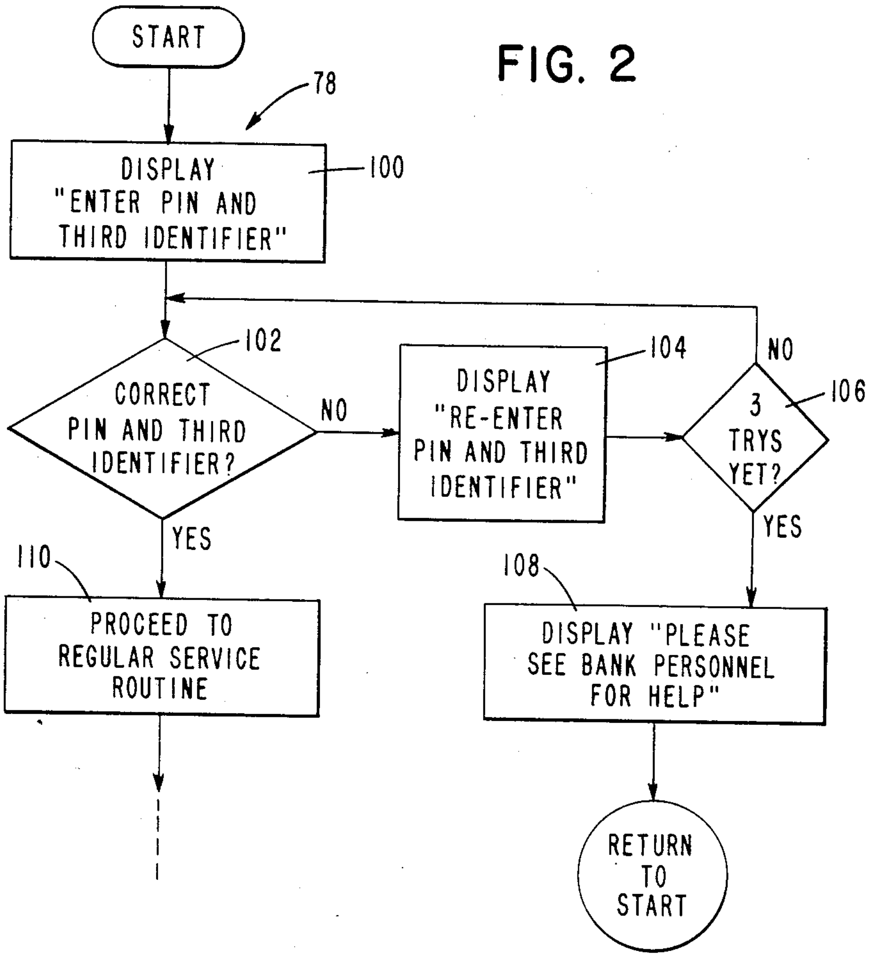
FIG. 2. is a flow chart showing the procedure used by a user of the system to operate one of the machines or terminals shown in the controlled access room shown in FIG. 1.

The routine 78, shown in FIG. 2, shows the general steps required of a valid user to gain access to any of the terminals or machines shown in controlled access room 16. For example, if a user of the system wished to make a deposit of several checks, for example, and he also wished to obtain some cash, he would use the ATM 26. The ATM 26 (FIG. 3) is conventional such as an NCR-1770 ATM which is available from NCR Corporation of Dayton, Ohio. The ATM 26 includes a communication interface 80 (connected to communication line 56) by which this terminal is coupled to the branch controller 54. The ATM 26 also includes a keyboard 82, a display 84, a cash dispenser 86, a receipt printer 88, a journal printer 89, an envelope printer 90, a ROM 92, RAM 94, a processor 96, and interface and control logic 98 which interconnects the various components mentioned.

With regard to routine 78 (FIG. 2), the first step therein is a display step 100 in which the request "Enter PIN and third identifier" is made on the display 84 (FIG. 3) of the associated machine like ATM 26. After the user enters his PIN and the third identifier, these two numbers are routed to the branch controller 54 where a comparison between the two numbers is made at step 102; this aspect will be described hereinafter. If the comparison does not indicate the correct two numbers at step 102, the ATM 26 will display (at step 104) the request, "Re-enter PIN and the third identifier number" on its display 84. After the PIN and third identifier are re-entered, an evaluation step 106 is made by the ATM 26 to determine whether 3 tries have been made as yet to enter the PIN and third identifier. If less than 3 tries have been attempted at step 106, the routine 78 returns to step 102. If 3 tries have been attempted, the display 84 on the ATM 26 will display the sign, "Please see bank personnel for help" as shown at step 108. The routine 78 then returns to "start".

If a user of the ATM 26, for example, enters his correct PIN and third identifier at step 102 in FIG. 2, the routine 78 proceeds to step 110 from which the ATM 26 is available to the user for the usual transactions associated with an ATM, such transactions as withdrawing cash and the like.

The routine 78 (FIG. 2) for gaining access to the machines shown in the controlled access room 16 in FIG. 1 is the same for each machine shown therein. After the routine 78 is employed by a user on the machine he wishes to operate, the user proceeds from step 110 to the regular program or service routine associated with that machine. This aspect will be discussed hereinafter.

When a user first attempts to gain access to the system 10 by inserting his card 50 into the lobby terminal 14, the data associated with the account number (first identifier) on the card may be received from the host system 74, for example, and stored temporarily in a portion of the RAM 62 of the branch controller 54 to have the data readily available. FIG. 4 is a schematic diagram showing a portion 112 of RAM 62 and the portion's organization. For each account number in the system 10, there is an associated PIN and associated data (shown in column 114) like customer or user name, balance in account, etc. The portion 112 is arranged as a first-in, first-out (FIFO) system with the most-recently requested account number (#821, for example) being shown at the top of the memory portion 112 and with the oldest requested account number (#842) being shown at the bottom. In the embodiment described, the third identifier is a two digit number; therefore, 100 different accounts can be accommodated as active accounts. It was felt that with a provision for 100 active users, an individual user would have adequate time to use his associated PIN and third identifier when using the machines in the controlled access room 16. Naturally, more than two digits for third identifiers may be used if necessary or desirable. When the 101st user inserted his card 50 in the lobby terminal 14, the following events would take place: the branch controller 54 would simply delete account #842 from the memory portion 112; all the remaining accounts would be shifted downwardly one line position, as viewed in FIG. 4; the data associated with the 101st user would be placed on the top line of memory portion 112; and this user would be assigned the numbers 00 as his third identifier. This process would be repeated throughout an operating day.

The general routine 78 shown in FIG. 2 may be modified slightly to include a search step (which would occur after step 100 in FIG. 2) to examine the memory portion 112 in FIG. 4 to determine whether or not the just-entered PIN and third identifier existed in the memory portion 112. If the PIN and third identifier were found on the same account number line in the memory portion 112, it means that these numbers are correct as shown at step 102 (FIG. 2), and therefore, the data (114) appearing for that account number and an appropriate start signal are transferred to machine ATM 26 (in the example being described) as part of step 110 in FIG. 2. If the PIN and third identifier were not found at all, the display 84 on the ATM 26 (FIG. 3) would indicate to the user the message shown in step 104 of FIG. 2. If the PIN and third identifier were found in the memory portion 112, but were not found on the same line therein, it means that the user has made an error in entering either the PIN or the third identifier and he would then, again proceed from step 104 in FIG. 2.

When several transactions are validly and routinely performed on a machine like ATM 26 in the example described, a record of the transactions is forwarded to the branch controller 54 which subsequently updates the associated account at the host system 74 as is conventionally done. This updating of accounts is done before any of the accounts in memory portion 112 (FIG. 4) are deleted therefrom.

Figure 5:
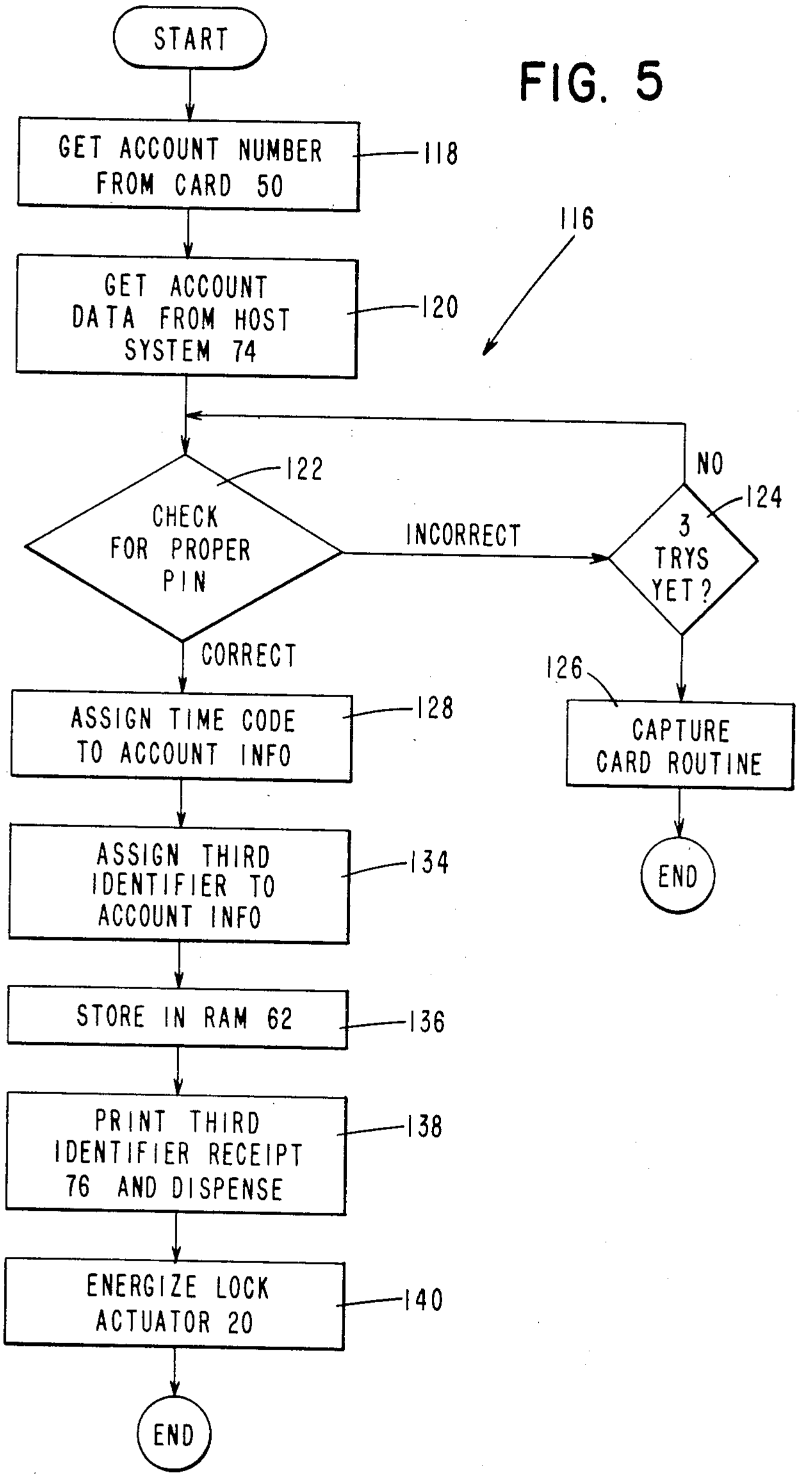
FIG. 5 is a flow chart showing a routine for assigning third identifiers and time codes associated with the system shown in FIG. 1.

FIG. 5 shows a flow chart or routine 116 which includes some of the steps associated with handling the card 50 in the public lobby room 12 to gain partial entry to the system 10 as previously described, and it also includes some additional steps to provide a means for clearing the RAM 62 in the branch controller 54 of accounts which are no longer needed at the system 10. The routine 116 includes: the step 118 of reading the account number from the magnetic card 50; the step 120 of getting the associated account data from the host system 74; the step 122 of checking for the proper PIN; the step 124 of examining the number of tries made to enter a proper PIN; and the step 126 of capturing the magnetic card 50 when an excessive number of tries at entering the PIN has not been successful, as previously described.

Assume that a user of the system 10 has entered the correct PIN. From step 122 in FIG. 5, the branch controller 54 assigns a time code to that particular associated account at step 128; a real time clock 130 (FIG. 1) associated with the branch controller 54 is used for this purpose. FIG. 6 shows diagrammatically the various elements stored in a memory portion 132 of RAM 62 of the branch controller 54. These elements in memory portion 132 include the account number, the associated PIN, the third identifier which is assigned by the controller 54, the data (account balance, customer address, etc.) associated with the account number, and the time code assigned to a particular account. In the example shown in FIG. 6, account #624, for example, was assigned the time code 14:00 (for 2:00 PM) as shown by step 128 in FIG. 5, was assigned the third identifier (01) as shown by step 134, and was stored in the portion 132 of the RAM 62 as shown by step 136. In the example described, the next user (account #871) of the system 10 operated the lobby terminal 14 four minutes later and was assigned the time code 14:04 and also was assigned his third identifier (02). The third identifier assigned to a user is transferred to the lobby terminal 14 where its associated printer 38 prints the third identifier on a receipt 76, as at step 138 in FIG. 5, and thereafter, the lock actuator 20 is energized at step 140 to permit a user of the system 10 to gain entry to the controlled access room 16 as previously explained.

Figure 7:
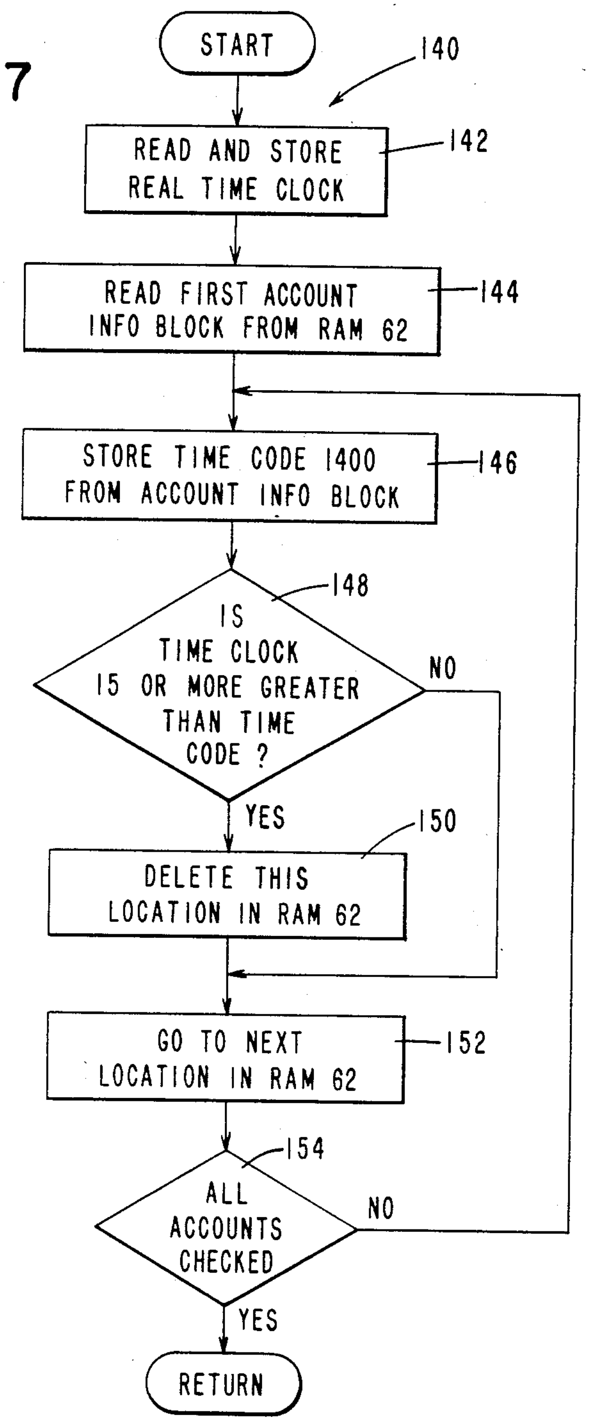
FIG. 7 is a flow chart showing a sub-routine for clearing the branch controller of accounts in which activity is completed.

FIG. 7 shows a sub-routine 140 which is used by the branch controller 54 for clearing the RAM 62 of those accounts for which activity is completed by users of the system 10. The branch controller 54 initiates the routine 140 once each minute throughout a business day. The first step 142 in the routine 140 is to read and store the time on the real time clock 130. During the next step 144, the controller 54 reads the first account information block from the portion 132 (FIG. 6) of RAM 62 to obtain the time code for that account, and then stores (at step 146) the associated time code in the RAM 62. Thereafter, the controller 54, in step 148, compares the real time from clock 130 with the time code for the associated account being evaluated, and if 15 or more minutes (for example) have elapsed since the receipt 76 containing the third identifier was issued to a user of the system 10, the branch controller 54 will delete this account from the portion 132 of the RAM 62 as shown at step 150. If less than 15 minutes has elapsed, the controller 54 proceeds to step 152 of the routine 140, at which step 152 the next account is similarly evaluated. When all accounts have been similarly checked at step 154, the controller 54 returns to its other operations. If at step 154 all the accounts have not been checked, the routine 140 returns to step 146 thereof.

Figure 3:
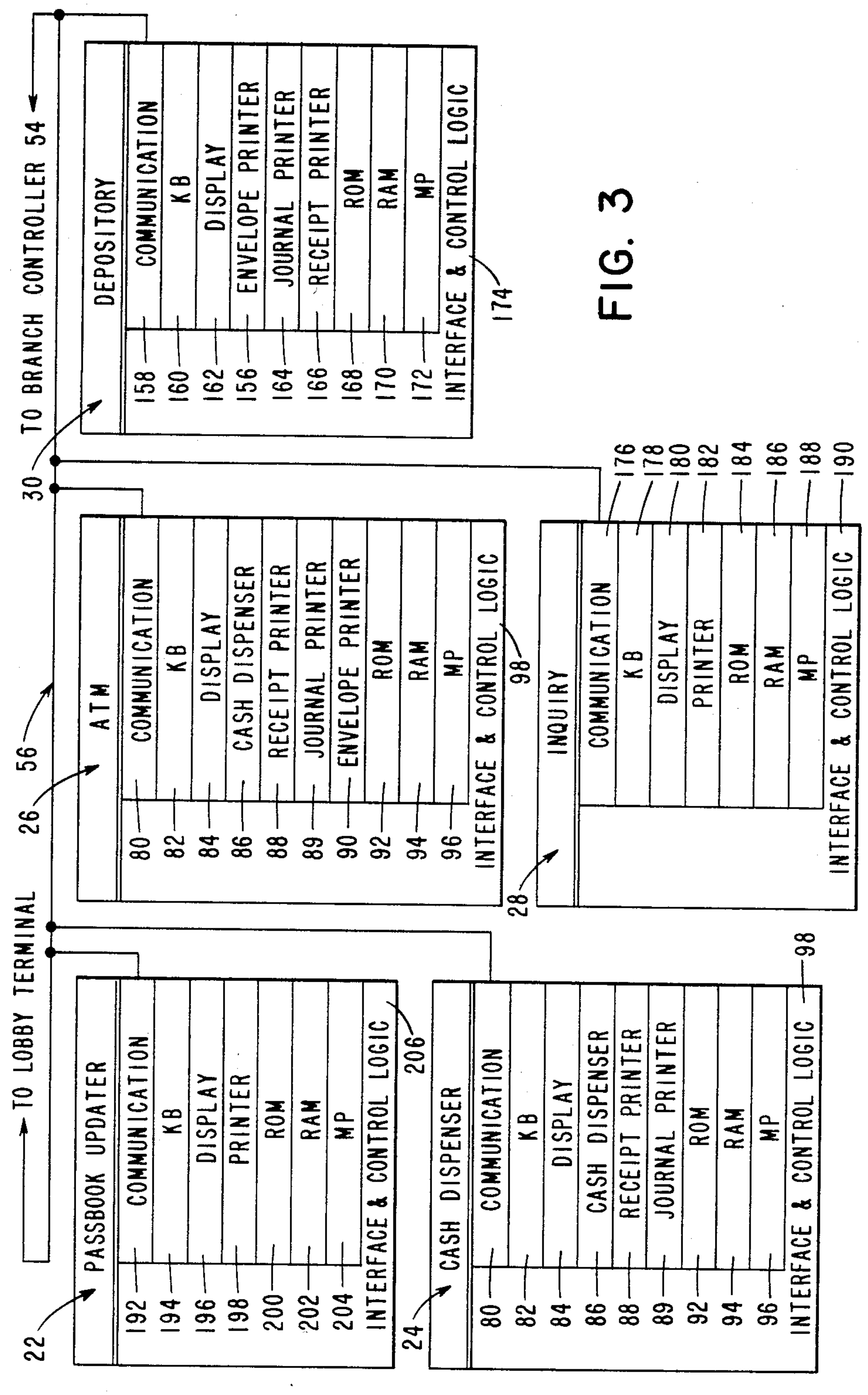
FIG. 3. is a schematic view showing the various components of each of the machines included in the controlled access room shown in FIG. 1.

The various machines shown in the controlled access room 16 in FIG. 1 are shown in more detail in FIG. 3. Access to each of these machines is the same as described previously with regard to the ATM 26, without the need to have a magnetic card reader at each machine. The various machines shown in FIG. 3 are merely illustrative, and the system 10 may be used to access different security areas or computer systems, for example, instead of the machines shown.

The depository 30 (FIG. 3) may be a conventional ATM like the NCR-1770 already described; however, the depository 30 is modified slightly to eliminate the cash dispenser normally associated with an ATM. After gaining access to the depository 30, a user then operates the machine in the usual manner. In this regard, for example, checks to be deposited are placed in a deposit envelope and the envelope is placed in the envelope printer 156 where the amount of deposit, account number, etc. are routinely printed on the envelope, which is then retained in the depository 30. The depository 30 has the usual communication interface 158, KB 160, display 162, journal printer 164, receipt printer 166, ROM 168, RAM 170, MP 172, and interface and control logic 174 which operate in the same general manner as already described in relation to ATM 26.

The cash dispenser 24 (FIG. 3) may be a conventional ATM like the NCR-1770 already described; however, the cash dispenser 24 is modified slightly to eliminate the function of receiving deposits. Accordingly, the same reference numerals assigned to components associated with the ATM 26 already described, are used to describe the same components associated with the cash dispenser 24; therefore a detailed explanation of these common components is not deemed necessary.

The inquiry terminal 28 (FIG. 3) is conventional such as an NCR-5012 terminal which is manufactured by NCR Corporation of Dayton, Ohio. The terminal 28 includes a communication interface 176, a KB 178, display 180, printer 182, ROM 184, RAM 186, MP 188, and interface and control logic 190 to couple the various components shown. Basically, the terminal 28 is used for making inquiries of the system 10, and the responses thereto are shown on the display 180; certain responses such as checking account balance, for example, may be printed by the printer 182 for issuance to the user.

The passbook updater 22 (FIG. 3) is used basically to update savings account books. On the days when interest is to be credited to savings accounts, there are usually long lines for this purpose at the teller stations of some banks. The passbook updater 22 is conventional such as an NCR-5023 terminal which is manufactured by the NCR Corporation of Dayton, Ohio. The updater includes a communication interface 192, a KB 194 display 196, printer 198, ROM 200, RAM 202, MP 204, and interface and control logic 206 which couples the various components shown. After gaining access to the updater 22 as previously described, a user enters his account number and the necessary request-initiation instructions on the KB 194, and thereafter, the user's savings account balance and accrued interest thereon to date are shown on the display 196. The user is then instructed (via the display 196) to insert his savings passbook into the printer 198 which updates his account by printing the interest accrued and the new balance, for example, on the appropriate line on the passbook as is conventionally done. The necessary instructions for effecting the various operations mentioned are stored in the ROM 200 or are loaded daily into the RAM 202, and the MP 204 is used to execute the instructions.

Some additional comments appear appropriate. In general, the time required for a magnetic card 50 to be entered into the associated card reader 36, read, and processed is approximately 12 seconds in the type of terminal 14 described. An average bank which might handle 1000 transactions per day, could process 1000 card-read transactions in 200 minutes with one machine like lobby terminal 14 shown in FIG. 1.

We claim:

1. A system having controlled access thereto, comprising:

means for entering first and second identifiers associated with a user of said system;

control means for receiving said first and second identifiers and for issuing a third identifier to said user via said entering means upon a satisfactory evaluation of said first and second identifiers; and said system having a plurality of entities and also having means for coupling said entities with said control means;

each said entity having means for entering said second and third identifiers associated with said user;

said control means having means for evaluating said second and third identifiers and for issuing a control signal to the associated said entity to enable that said user to gain access to the associated said entity upon a satisfactory evaluation of said second and third identifiers.

2. The system as claimed in claim 1 in which said means for entering said first identifier includes a card reader for reading a card on which said first identifier is recorded, and said means for entering said second and third identifiers at each said entity includes a keyboard to effect said entering of said second and third identifiers.

3. The system as claimed in claim 2 in which said plurality of entities comprises a plurality of financial transaction machines.

4. A system having controlled access thereto, comprising:

a first room;

means for entering first and second identifiers associated with a user of said system; said entering means being located in said first room;

a second room;

a normally-closed door preventing a user in said first room from entering said second room until a predetermined condition is met, and a means for opening said door when said predetermined condition is met;

control means for receiving said first and second identifiers and for issuing a third identifier to said user via said entering means upon a satisfactory evaluation of said first and second identifiers; said third identifier being effective to satisfy said predetermined condition to enable said user to enter said second room;

said system having a plurality of entities located in said second room, and also having means for coupling said entities with said control means;

each said entity having means for entering said second and third identifiers associated with said user;

said control means having means for evaluating said second and third identifiers and for issuing a control signal to the associated said entity to enable that said user to gain access to the associated said entity upon a satisfactory evaluation of said second and third identifiers.

5. The system as claimed in claim 4 in which said means for entering said first identifier includes a card reader for reading a card on which said first identifier is recorded, and said means for entering said second and third identifiers at each said entity includes a keyboard to effect said entering of said second and third identifiers.

6. The system as claimed in claim 5 in which said plurality of entities comprises a plurality of financial transaction machines.

7. The system as claimed in claim 6 in which said entering means includes a printer for printing a receipt on which said third identifier is printed.

8. A system comprising:

means for identifying a user of said system, comprising:

means for entering a first number into said identifying means;

means for entering a second number into said identifying means; and means for indicating a number to a user of said identifying means;

said system further comprising:

control means for receiving said first and second numbers from said identifying means and for generating a third number in response to a satisfactory evaluation of said first and second numbers, said third number being indicated to said user via said indicating means;

said control means also having means for storing the said third number associated with a particular said second number;

a plurality of machines, with each said machine being capable of performing at least one specific function after access thereto is achieved;

each said machine of said plurality having means for gaining access thereto comprising:

means for entering said second and third numbers into the associated machine, means for coupling the associated said machine with said control means to transfer said second and third numbers thereto; said control means having means for comparing said second and third numbers received from said coupling means with said second and third numbers in said storing means and for issuing an access signal to the associated said machine upon a satisfactory comparison thereof, said access signal when received by the associated said machine enabling a user of said last named machine to perform at least one of said specific functions thereon.

9. The system as claimed in claim 8 in which said means for entering said first number into said identifying means includes a magnetic card reader for reading said first number from a user's card.

10. The system as claimed in claim 9 in which said indicating means includes a printer for printing a receipt having said third number printed thereon.

11. The system as claimed in claim 10 in which said plurality of machines comprises a plurality of self-service, financial transaction machines.

12. The system as claimed in claim 8 in which said means for entering said first number into said identifying means includes a card reader by which said first number is entered, and in which said means for entering said second and third numbers into an associated said machine includes a keyboard.

13. The system as claimed in claim 8 in which said control means includes a means for providing a timing period to enable said third number to be valid only during said timing period when entered with said second number into said plurality of machines.

14. A method of operating a system comprising the steps of:

(a) requiring a user of the system to enter first and second identifiers associated with said user, to gain partial access to said system;

(b) issuing a third identifier to said user based upon a satisfactory evaluation of the user's first and second identifiers; and (c) requiring that said user enter said second and third identifiers to gain complete access to said system.

15. The method as claimed in claim 14 in which said system includes a plurality of financial transaction machines and said requiring step is effected by entering said second and third identifiers on a keyboard without the use of a card reader at said plurality of financial transaction machines.

16. The method as claimed in claim 15 in which said issuing step is effected by printing said third identifier on a receipt.

* * * * *